United States Patent
Liu et al.

(10) Patent No.: US 12,133,533 B2
(45) Date of Patent: Nov. 5, 2024

(54) FUNCTIONALIZED BRAN

(71) Applicant: General Mills, Inc., Minneapolis, MN (US)

(72) Inventors: Xia Liu, Maple Grove, MN (US); John McKeehen, Edina, MN (US); Christine Ng, Minneapolis, MN (US); Nesli Sozer, Espoo (FI); Markus Nikinmaa, Helsinki (FI)

(73) Assignee: General Mills, Inc., Minneapolis, MN (US)

( * ) Notice: Subject to any disclaimer, the term of this patent is extended or adjusted under 35 U.S.C. 154(b) by 767 days.

(21) Appl. No.: 17/269,020

(22) PCT Filed: Aug. 22, 2018

(86) PCT No.: PCT/US2018/047534
§ 371 (c)(1),
(2) Date: Feb. 17, 2021

(87) PCT Pub. No.: WO2020/040757
PCT Pub. Date: Feb. 27, 2020

(65) Prior Publication Data
US 2021/0315218 A1    Oct. 14, 2021

(51) Int. Cl.
| | | |
|---|---|---|
| *A21D 2/26* | (2006.01) | |
| *A23J 1/12* | (2006.01) | |
| *A23J 3/18* | (2006.01) | |
| *A23L 7/10* | (2016.01) | |
| *A23L 7/17* | (2016.01) | |
| *A23L 33/185* | (2016.01) | |

(52) U.S. Cl.
CPC ............... *A21D 2/265* (2013.01); *A23J 1/12* (2013.01); *A23J 3/18* (2013.01); *A23L 7/115* (2016.08); *A23L 7/17* (2016.08); *A23L 7/198* (2016.08); *A23L 33/185* (2016.08)

(58) Field of Classification Search
CPC . A21D 2/265; A23L 7/198; A23L 7/17; A23L 7/115; A23L 33/185; A23J 1/12; A23J 3/18
USPC ....................................................... 426/622
See application file for complete search history.

(56) References Cited

U.S. PATENT DOCUMENTS

| | | | |
|---|---|---|---|
| 6,054,149 A | 4/2000 | Hammond | |
| 8,053,010 B2 | 11/2011 | Monsalve-Gonzalez | |
| 2015/0004301 A1* | 1/2015 | Arndt | A23L 7/198 |
| | | | 426/622 |
| 2017/0000170 A1* | 1/2017 | Freyre | A23L 7/115 |

FOREIGN PATENT DOCUMENTS

| | | | |
|---|---|---|---|
| CN | 106360317 | | 2/2017 |
| JP | 2000186044 | | 7/2000 |
| JP | 2000186044 A | * | 7/2000 |
| WO | WO 2011/058220 | | 5/2011 |

OTHER PUBLICATIONS

Translation of JP-2000186044-A (Year: 2000).*
Katina et al., "*In situ Production and Analysis of Weissella Confusa Dextran in Wheat Sourdough*", Food Microbiology, No. 26, pp. 734-743, 2009.
Nikinmaa et al., "*Bioprocessing of Bran with Exopolysaccharide Producing Microorganisms as a Tool to Improve Expansion and Textural Properties of Extruded Cereal Foams with High Dietary Fibre Content*", LWT—Food Science and Technology, No. 77, pp. 170-177, 2017.
Pai et al., "*Importance of Extensional Rheological Properties on Fiber-Enriched Corn Extrudates*", Journal of Cereal Science, No. 50, pp. 227-224, 2009.
Juvonen et al., "*The Impact of Fermentation with Exopolysaccharide Producing Lactic Acid Bacteria on Rheological, Chemical and Sensory Properties of Pureed Carrots (Daucus carota L.)*", Internaiontal Journal of Food Microbiology, No. 207, pp. 109-118, 2015.

* cited by examiner

*Primary Examiner* — Brent T O'Hern
(74) *Attorney, Agent, or Firm* — Rachel A. Kahler

(57) ABSTRACT

A method is described for treating bran to improve sensory attributes in food products made with the treated bran. The method includes acidifying a bran to a pH of less than 5 for a period of time sufficient to achieve an increase in soluble protein, then increasing the pH to at least 5.5. Also described are compositions including a treated bran, and methods of using a treated bran to increase bran content in foods or to improve organoleptic qualities in foods containing bran.

4 Claims, No Drawings

FUNCTIONALIZED BRAN

CROSS-REFERENCE TO RELATED APPLICATIONS

The present application represents a National Stage application of PCT/US2018/047534 entitled "Functionalized Bran" filed Aug. 22, 2018. The entire content of this application is incorporated herein by reference.

BACKGROUND OF THE INVENTION

Dietary fiber is a carbohydrate component of foods that the human body cannot absorb or break down. Dietary fiber provides a number of benefits to human health, including helping to maintain a healthy weight, reducing cholesterol, reducing blood sugar levels, and improving digestive health. Insoluble dietary fiber, which is found in abundant amounts as part of the fiber content in bran of grains, in particular, may play roles in promoting satiety and digestive health. However, many people do not eat the recommended amounts of dietary fiber due to its contribution of unpleasant structure, texture, and taste profile in foods rich in insoluble fiber content. Thus, there is a need to provide new options for increasing fiber consumption.

SUMMARY

Provided herein is a method of producing a treated bran. A method of treating bran includes acidifying a bran to a pH of less than 5 for a sufficient period of time to increase soluble protein content of the bran by at least 10%, and after the period of time, increasing the pH of the acidified bran to a pH of at least 5.5 to produce the treated bran.

In some embodiments, a step of increasing the pH of the acidified bran includes increasing the pH of the acidified bran to a pH of from 5.5 to about 8.

In some embodiments, a period of time sufficient to increase soluble protein content of bran by at least 10% can be at least 1 hour.

In some embodiments, an acidifying step can result in an acidified bran pH of 4.5 or less.

A bran can be a wheat bran, an oat bran, a rye bran, a corn bran, or a rice bran.

In some embodiments, a method of producing a treated bran can include a step of drying the treated bran.

In some embodiments, a method of producing a treated bran can include milling the treated bran to produce a milled bran.

Also provided herein is a treated bran made using a method of treating bran provided herein.

Also provided herein is an improved flour. An improved flour includes a flour and treated bran as provided herein.

In some embodiments, an improved flour can include a flour that is a whole grain flour. In some embodiments, an improved flour can include a flour that comprises an endosperm flour.

In some embodiments, an improved flour can have a whole grain bran content.

In some embodiments, the bran content of an improved flour can consist essentially of the treated bran.

Further provided herein is a method of increasing bran content in a food. A method of increasing bran content in a food includes incorporating treated bran from a method of producing a treated bran provided herein into ingredients of the food and producing the food from the ingredients.

In some embodiments of a method of increasing bran content in a food, incorporating treated bran can include incorporating an improved flour that includes the treated bran and a flour.

In some embodiments of a method of increasing bran content in a food, the step of producing the food from the ingredients can include extruding the ingredients to produce the food. In some embodiments, a step of extruding ingredients can result in the food being puffed and having a density of less than 300 kg/m3.

In some embodiments of a method of increasing bran content in a food, the step of producing the food from the ingredients can include producing a baked good.

Also provided herein is a puffed food. A puffed food can have a bran content of at least 12% (e.g., at least 17%) by weight, and having a density of less than 300 kg/m3 (e.g., less than 250 kg/m3).

In some embodiments, a puffed food provided herein can include a dietary fiber content of at least 12% by dry weight.

Additional objects, features and advantages of the invention will become more readily apparent from the following detailed description.

DETAILED DESCRIPTION

Whole grain and high fiber foods can be part of a diet that achieves increased dietary fiber. Whole grain foods include bran at levels, relative to endosperm and germ levels, that are equivalent to those found in the whole kernel of the grain. High fiber foods can include fiber from any source, including bran, at levels that provide at least 20% of the recommended daily intake of fiber per serving. However, increasing fiber content in foods can lead to reduction in desired organoleptic traits in such foods. For example, as fiber is increased in puffed foods, such as ready-to-eat (RTE) cereals and snacks, such foods puff less effectively. Puffed foods with higher fiber content may also exhibit lower crispness or increased hardness. Similarly, in baked goods (including foods that are baked or fried), such as fresh or shelf-stable breads, cakes, or bars, higher fiber content can lead to less desirable textural traits, such as high density, or increased chewiness. Non-puffed extruded foods that are high in fiber can exhibit high density or hardness. Thus, although whole grain and high fiber foods could be used to increase fiber intake, consumers often prefer grain-based products that have lower levels of fiber.

It was discovered, and is described herein, that a method of treating a bran (e.g., a wheat bran, an oat bran, a barley bran, or the like) can increase the function of the bran when used in food product. That is, a treated bran provided herein can reduce the negative effects of the bran on desired organoleptic qualities, such as reduced puffing, increased hardness, or lower crispness in puffed foods, or increased density or increased chewiness in baked foods that contain the treated bran. A method of treating a bran provided herein includes acidifying the bran to a pH of less than 5 for a sufficient period of time to increase soluble protein content of the bran by at least 10%, and after the period of time, increasing the pH of the acidified bran to a pH of at least 5.5. As used herein, a "treated bran" refers to bran that has been treated with both an acidifying step as described herein, and a step of increasing the pH.

Acidifying a bran, as provided herein, refers to the addition of an acidulent to a bran to achieve a pH of less than 5 (e.g., a pH 4.8 or less, or a pH 4.5 or less). As used herein, the term "acidulent" refers to a compound that reduces the pH of a bran, but does not include microbial fermentation.

Suitable acidulents include, for example, organic acids (e.g., citric acid, acetic acid, lactic acid, malic acid, or the like), non-organic acids (e.g., hydrochloric acid, sulfuric acid, and the like), carbonated water, and the like, or any combination thereof. For example, a step of acidifying a bran can include adding an organic acid to a bran that has been removed from the grain (e.g., miller's bran, or bran flour). In some embodiments, where the bran is in a dry state, an acidulent and sufficient water can be added to bran to achieve the desired pH. In some embodiments, a step of acidifying a bran can be performed on intact kernels of grain, such as during tempering of the grain.

An acidifying step is performed for a sufficient period of time to achieve at least a 10% (e.g., at least 12%, at least 15%, or at least 20%) increase in soluble protein in the bran. It was surprisingly found that an increase in soluble protein in a bran of at least 10% correlated to an increase in function of the bran when used in food products. For example, an increase in soluble protein of about 10% statistically significantly ($p<0.05$) reduced density in a puffed product made with a flour that included a treated wheat bran in an amount of about 20% by weight and 80% by weight wheat endosperm flour.

In some embodiments, a sufficient period of time can be at least 1 hour (e.g., at least 2 hours, or from 1 to 3 hours). The period of time that a bran is acidified can be increased or decreased as needed to achieve the desired increase in soluble protein. In some embodiments, an acidifying step can be performed at a temperature at about room temperature (e.g., about 20° C. to about 25° C.). In other embodiments, an acidifying step can be performed at a temperature above 25° C. As temperature is increased, the period of time that is sufficient to achieve at least a 10% increase in soluble protein in a bran may decrease.

As used herein, soluble protein of a bran is measured as a percentage by wet weight using a DC Protein assay kit (Bio-Rad Laboratories, Inc., USA) and bovine serum albumin protein standard (kit catalog #500-0112), according to the manufacturer's protocol, then converted to dry weight to control for moisture content. Briefly, bran to be analyzed is diluted in water (10× to 25×) to ensure homogeneity of the sample, then centrifuged. Supernatant of each sample is recovered and further diluted in water (to a final dilution of 100× to 125×) and analyzed spectrophotometrically at 750 nm using the reagents included in the kit. A standard curve is produced using bovine serum albumin at the same time the sample supernatants are analyzed according to the manufacturer's protocol. Soluble protein is the amount of protein measured in the supernatant as determined based on the standard curve. To determine a change in soluble protein (e.g., an increase in soluble protein) in a bran, the amount of soluble protein measured after a period of time during acidification of the bran is compared to the amount of soluble protein measured prior to acidification of the bran.

Once a soluble protein content increase of at least 10% is achieved, the pH of an acidified bran is increased to a pH of at least 5.5 (e.g., from 5.5 to about 8, or from about 5.5 to about 7.5). The pH of an acidified bran need not be increased to a neutral pH (e.g., about 6.5 to about 7.5, or about 7.0). Surprisingly, increasing the pH of an acidified bran retains the benefits that are correlated to an increase in soluble protein, but reduces negative impacts of low pH on flavor and shelf life. A step of increasing the pH of an acidified bran can include adding a base (e.g., sodium bicarbonate, calcium bicarbonate, sodium hydroxide, and combinations thereof, and the like) in an amount sufficient to achieve the desired pH. In some embodiments, increasing the pH of an acidified bran can include a step of adding sufficient base to neutralize the acidulent added to the bran during the acidification step. In some embodiments, a step of increasing the pH of an acidified bran can achieve a pH that is at or above the pH of the bran prior to the acidification step.

In some embodiments, a step of increasing the pH of an acidified bran can be performed immediately after achieving the desired increase in soluble protein. In some embodiments, an acidified bran can be stored (e.g., dried or frozen) for a period of time prior to increasing the pH. In some embodiments, the pH of a bran that has been acidified while part of an intact grain kernel (e.g., during tempering of the grain) can be increased either before or after the bran has been separated from the endosperm and/or germ (e.g., during milling).

In some embodiments, a treated bran can be further processed prior to use in a food. For example, a treated bran can be dried for storage and/or sale.

In another example, a treated bran can be milled to make a milled bran. In some embodiments, a milled bran can have an average particle size similar to an endosperm flour of the same grain type.

In some embodiments, a treated bran can be combined with a flour, such as an endosperm flour and/or a germ flour, to produce an improved flour. Treated bran can comprise part or substantially all of the bran content in an improved flour. For example, the bran content of an improved flour can consist essentially of a treated bran (e.g., the bran content is at least 95%, at least 98%, or at least 99% treated bran).

Treated bran can be combined with a flour to produce an improved flour in an amount of at least 2.5% treated bran by weight of the flour (e.g., at least 5%, at least 10%, or at least 20%). As used herein, an "improved flour" refers to a flour combined with a treated bran. As used herein, a flour can be any powdered plant product, including grain (e.g., wheat, oat, rice, rye, and the like, or combinations thereof) flour (e.g., endosperm, germ, whole grain, or combinations thereof), nut (e.g., almond, cashew, or the like, or combinations thereof) flour, legume (e.g., lentil, soybean, chickpea, or the like, or combinations thereof) flour, tuber (e.g., potato, tapioca, and the like, or combinations thereof) flour, or the like, or combinations thereof.

In some embodiments, an improved flour can have a whole grain bran content. As used herein, the term "whole grain bran content" refers to a grain flour that has a bran content at levels, relative to endosperm and germ levels, that are equivalent to those found in the whole kernel of the grain.

An improved flour can be a combination of any treated bran and any flour. For example, an improved flour can combine one or more wheat or non-wheat (e.g., rye, corn, oat, or the like) treated bran and a wheat endosperm flour. In another example, an improved flour can combine one or more rye or non-rye treated bran and a whole grain rye flour. In yet another example, an improved flour can combine one or more treated bran with a legume flour.

A treated bran provided herein can be used in a method of increasing bran content in a food. In some embodiments, a method of increasing bran content of a food provided herein can be used to produce a food with similar organoleptic qualities (e.g., density, chewiness, crispiness, or the like) as an equivalent food that contains less bran. For example, a method of increasing bran content of a food can be used to provide a shelf stable brownie with least 5 g of fiber per serving that has similar chewiness and/or density as an equivalent shelf stable brownie containing less than 5 g of fiber per serving.

A method of increasing bran content in a food can comprise incorporating a treated bran in any form into ingredients of a food. For example, a treated bran can be included in food ingredients immediately after increasing the pH, after drying, as a milled bran, or as part of an improved flour, or any combination thereof.

A treated bran provided herein can be used in a method of improving organoleptic qualities (e.g., density, chewiness, crispiness, or the like) as an equivalent food that contains a similar bran content, but without the use of a treated bran. For example, a method of improving organoleptic qualities of a food can be used to provide a whole grain RTE cereal with reduced density or increased crispness over an equivalent whole grain RTE cereal that does not include a treated bran.

A method of improving organoleptic qualities in a food can comprise incorporating a treated bran in any form into ingredients of a food. For example, a treated bran can be included in food ingredients immediately after increasing the pH, after drying, as a milled bran, or as part of an improved flour, or any combination thereof.

Foods (e.g., RTE cereal, extruded snacks, baked goods, or the like) including a treated bran are provided herein. A food including a treated bran can include one or more benefits (e.g., reduced density, increased crispness, reduced chewiness, increased crumb softness, or the like) over an equivalent food that does not include a treated bran. As used herein, food qualities, such as crispness, chewiness, crumb softness, hardness, and the like can be measured using standard protocols. For example, an extruded food (e.g., a puffed or non-puffed RTE cereal or snack food) including a treated bran can provide at least 5% (e.g., at least 6%, or at least 10%) additional total dietary fiber by dry weight of the food and still achieve a specific density (i.e., mass/volume) that is similar to an equivalent puffed food that does not include a treated bran. In another example, an extruded food that contains a treated bran can achieve a specific density that is at least 10% (e.g., at least 12% lower, from about 10% to about 40%, or from about 12% to about 35%) lower than an equivalent puffed food with the same bran content, but that does not contain a treated bran.

In some embodiments, an extruded food (e.g., a puffed RTE cereal or snack) including a treated bran can have a bran content of at least 12% (e.g., at least 17%, at least 25%, or at least 30%) by weight and achieve a specific density of less than 300 (e.g., less than 250, or less than 220) kg/m$^3$. In some embodiments, a puffed or non-puffed RTE cereal including a treated bran can have a bran content of at least 12% (e.g., at least 15%, or at least 17%) total dietary fiber by weight of the RTE cereal and achieve a specific density of less than 300 (e.g., less than 250, or less than 220) kg/m$^3$.

In some embodiments, a baked good (e.g., baked or fried dough-based goods), such as whole grain bread, a multi-grain bread, a brown bread, a brownie, a blondie, a dessert bar, a cookie, a cake, a croissant, a pizza crust, a scone, a cupcake, a donut, a churro, bagel, or the like, including a treated bran can provide at least 5% (e.g., at least 6%, or at least 10%) additional total dietary fiber by dry weight of the baked good and still achieve a specific density (i.e., mass/volume), a chewiness, and/or a crumb softness that is similar to an equivalent bread that does not include a treated bran. For example, a bread dough formulation that produces a baked bread with a specific volume of about 250 kg/m$^3$ can be modified to include 10% more fiber than the original bread dough formulation and produce a baked bread that still has a specific volume of about 250 kg/m$^3$.

In some embodiments, a baked good that contains a treated bran can achieve a specific density that is at least 10% (e.g., at least 12% lower, from about 10% to about 40%, or from about 12% to about 35%) lower than an equivalent baked good with the same fiber content, but that does not contain a treated bran. For example, a brownie formulation having a specific density of about 550 kg/m$^3$ can be modified to include a treated bran, while retaining the same fiber content, to produce a brownie having a density of about 500 kg/m$^3$.

A food including a treated bran provided herein can be any food, including fresh, frozen, refrigerated, or shelf stable foods, packaged or unpackaged foods. Foods that are particularly suited to the inclusion of a treated bran include RTE cereal, puffed snacks, and packaged or fresh baked goods (e.g., cookies, brownies, cakes, and the like).

EXAMPLES

Example 1—Bran Treatment

Samples of 20 g each of freeze dried wheat bran and freeze dried rye bran were combined with 80 g water and acidified from a pH of about 6.7 to a pH of 3.5, 4.5, or 5.5 using lactic acid, and allowed to incubate at room temperature for 1, 3, or 5 hours. Soluble protein was determined as described above for each pH and time point, and the soluble protein by dry weight basis was calculated. Soluble protein is shown in Table 1.

TABLE 1

| Sample | Bran type | pH | Acidification time (hours) | % soluble protein by dry weight | % change in soluble protein from control |
|---|---|---|---|---|---|
| Wheat control | Wheat | 6.7 | 0 | 3.11 | 0 |
| 1W | Wheat | 5.5 | 1 | 2.55 | −17.9 |
| 2W | Wheat | 5.5 | 3 | 2.70 | −13.2 |
| 3W | Wheat | 5.5 | 5 | 3.87 | +24.6 |
| 4W | Wheat | 4.5 | 1 | 2.80 | −9.9 |
| 5W | Wheat | 4.5 | 3 | 3.43 | +10.4 |
| 6W | Wheat | 4.5 | 5 | 3.78 | +21.0 |
| 7W | Wheat | 3.5 | 1 | 3.13 | +0.6 |
| 8W | Wheat | 3.5 | 3 | 3.41 | +9.7 |
| 9W | Wheat | 3.5 | 5 | 3.79 | +22.0 |
| Rye control | Rye | 6.7 | 0 | 6.43 | 0 |
| 1R | Rye | 5.5 | 1 | 5.98 | −6.9 |
| 2R | Rye | 5.5 | 3 | 7.03 | +9.4 |
| 3R | Rye | 5.5 | 5 | 7.53 | +17.2 |
| 4R | Rye | 4.5 | 1 | 4.20 | −34.7 |
| 5R | Rye | 4.5 | 3 | 8.06 | +25.4 |
| 6R | Rye | 4.5 | 5 | 7.72 | +20.1 |
| 7R | Rye | 3.5 | 1 | 6.09 | −5.2 |
| 8R | Rye | 3.5 | 3 | 8.28 | +28.9 |
| 9R | Rye | 3.5 | 5 | 8.56 | +33.2 |

As can be seen in Table 1, soluble protein content could be increased by at least 10% within 5 hours at room temperature for each tested pH and for both wheat and rye. It would be expected that soluble protein content development could be accelerated at higher temperatures (e.g., 25° C., 30° C., or 40° C.). Without being bound to theory, the initial drop in soluble protein content at earlier time points is believed to be due to a reduced solubility of protein, in general, at lower pH.

A second test on rye bran was performed as described above, except that acidification treatment was performed at pH 4.5 and pH 3.5 for 5, 8, or 10 hours. The soluble protein contents from this test are shown in Table 2.

TABLE 2

| Sample | Bran type | pH | Acidification time (hours) | % soluble protein | % change in soluble protein from control |
|---|---|---|---|---|---|
| Rye control | Rye | 6.7 | 0 | 6.43 | 0 |
| 10R | Rye | 4.5 | 5 | 9.41 | +46.4 |
| 11R | Rye | 4.5 | 8 | 10.04 | +56.2 |
| 12R | Rye | 4.5 | 10 | 10.39 | +61.7 |
| 13R | Rye | 3.5 | 5 | 9.72 | +51.2 |
| 14R | Rye | 3.5 | 8 | 10.43 | +62.4 |
| 15R | Rye | 3.5 | 10 | 11.47 | +78.5 |

Example 2—Effect of Treated Bran on Puffing and Texture

Rye bran and wheat bran were acidified with lactic acid to a pH of 4.5 for 3 or 10 hours, then the pH was increased to 6.7 using 1 M NaOH to produce treated rye bran and treated wheat bran, respectively. Treated bran was then freeze dried and milled to achieve a consistent particle size distribution with a D50 of about 200 μm to reduce the effect of particle size on extrusion between samples. Similarly, rye endosperm flour was used as the basis to standardize extrusion conditions for all variables. Treated wheat bran was combined with rye endosperm flour at a rate of 40% treated bran by weight to produce an improved flour. The wheat control included untreated wheat bran milled to the same specifications as the treated wheat bran combined with rye endosperm flour at a rate of 40% untreated bran by weight. Treated rye bran was combined with rye endosperm flour at a rate of 32% treated bran by weight to produce an improved rye flour. The rye control included untreated rye bran milled to the same specifications as the treated rye bran combined with rye endosperm flour at a rate of 32% untreated bran by weight. The improved flours and control flours were fed into a twin screw extruder at a rate of about 60 g/min, a water feed rate from 4.7 to 7 g/min, a barrel temperature of 95-110° C., a die temperature of 120° C., a round die having a diameter of 3 mm, and a screw speed of 350 rpm. The samples were allowed to expand freely upon extrusion into ropes.

The extruded ropes were measured to determine expansion rate (average diameter/diameter of the die opening), density, and texture (hardness, crispness work, and crispness index).

Texture was measured on 10 mm long rope samples using a TA.XT2i Texture Analyzer (Stable Micro Systems, Ltd., Godalming, UK) fitted with a 30 kg load cell and a cylindrical 25 mm aluminum probe. Measurements from the TA.XT2i Texture Analyzer were recorded into a data file for each sample using Exponent software v. 5.1.2.0 (Stable Microsystems, UK). The samples were deformed at 70% strain using the Texture Analyzer probe as previously described (Alam et al. 2014. "Influence of particle size reduction on structural and mechanical properties of extruded rye bran." Food and Bioprocess Technology. 7(7), pp 2121-33). Hardness was determined as peak force in N.

Crispness work ($C_w$) (measured in N*mm) was calculated using Equation 1 (Van Hecke et al., 1995. "Texture and Structure of Crispy-Puffed Food Products Part II: Mechanical Properties in Structure." *J. Texture Stud.* 29, pp 617-632):

$$C_w = A/N \quad \text{Equation 1}$$

where A is the area under the force-deformation (f-d) curve measured in N*mm, and N is the number of peaks.

Crispness index ($C_i$) (unitless) was calculated using Equation 2 (Heidenreich et al., 2004. "Relationship Between Water Activity and Crispness of Extruder Rice Crisps." *J. Texture Stud.* 35, pp 621-633):

$$C_i = \frac{L_N}{(A * F_{mean})}$$

where $L_N$ is the normalized curve length (length of actual curve/maximum force), A is the area under the f-d curve measured in N*mm, and $F_{mean}$ is the sum of the actual force values in the data file divided by the number of data points.

The results are shown in Table 3 (wheat) and Table 4 (rye).

TABLE 3

| Sample | Acidification time (hours) | Soluble protein (% dry weight) | Expansion rate | Density (kg/mm³) | Hardness (N) | Crispness work (N * mm) | Crispness index |
|---|---|---|---|---|---|---|---|
| Wheat control | 0 | 3.1 | 313 | 241 | 53 | 2.6 | 0.0016 |
| 20 | 3 | 4.2 | 337 | 212 | 48 | 1.3 | 0.0065 |
| 21 | 10 | 4.1 | 346 | 211 | 46 | 1.3 | 0.0062 |

TABLE 4

| Sample | Acidification time (hours) | Soluble protein (% dry weight) | Expansion rate | Density (kg/mm³) | Hardness (N) | Crispness work (N * mm) | Crispness index |
|---|---|---|---|---|---|---|---|
| Rye control | 0 | 6.4 | 380 | 225 | 55 | 2.1 | 0.0028 |
| 30 | 3 | 7.7 | 409 | 155 | 30 | 0.6 | 0.0246 |
| 31 | 10 | 9.5 | 421 | 153 | 27 | 0.6 | 0.0316 |

As can be seen in Table 3, treated wheat bran that has been acidified at pH 4.5 for 3 to 10 hours to achieve about a 32-35% increase in soluble protein improved expansion rate by about 7.5% to about 11%, reduced density by about 12%, reduced hardness by about 9% to about 13%, reduced crispness work by about 50%, and increased crispness index by at least 3.5-fold.

As can be seen in Table 4, treated rye bran that has been acidified at pH 4.5 for 3 to 10 hours to achieve about a 20-48% increase in soluble protein improved expansion rate by about 7.5% to about 11%, reduced density by about 30% to about 32%, reduced hardness by about 45% to about 51%, reduced crispness work by at least 70%, and increased crispness index by at least 8-fold.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A puffed food, the puffed food having a bran content of at least 12% by weight, and having a density of less than 300 kg/m³, wherein the bran content comprises a treated bran produced by a method comprising:
- a. acidifying a bran to a pH of less than 5 for a sufficient period of time to increase soluble protein content of the bran by at least 10% by dry weight, and
- b. after the period of time, increasing the pH of the acidified bran to a pH of at least 5.5 to produce the treated bran.

2. The puffed food of claim 1, wherein the bran content is at least 17% by weight.

3. The puffed food of claim 1, wherein the density is less than 250 kg/m³.

4. The puffed food of claim 1, wherein the puffed food provides a dietary fiber content of at least 12% by dry weight.

\* \* \* \* \*